June 11, 1935.  E. J. W. RAGSDALE  2,004,829
BRAKING MEMBER
Filed Nov. 12, 1930

INVENTOR.
EARL J.W. RAGSDALE.
BY
ATTORNEY.

Patented June 11, 1935

2,004,829

UNITED STATES PATENT OFFICE 2,004,829

BRAKING MEMBER

Earl J. W. Ragsdale, Norristown, Pa., assignor to Budd Wheel Company, Philadelphia, Pa., a corporation of Pennsylvania Application November 12, 1930, Serial No. 495,043

12 Claims. (Cl. 188—218)

My invention pertains to the art of braking elements and it has been my object to produce a braking member having an improved braking surface. Braking members of the prior art, and especially brake drums of automobiles, have been subject to a heavy abrasive action under the influence of the friction brake shoes, resulting in the wearing down of the brake drum in a relatively short time.

It has been a principal object of my invention to produce a braking member having a braking surface which will not only resist initially this abrasive effect of the complemental braking element, but which will build up an increasing resistance to it.

It has been a further object of my invention to produce a braking member which is capable of hardening by cold working to a degree considerably in excess of the hardening produced in a carbon steel member by a corresponding amount of cold working and yet remains ductile and susceptible to yet further hardening under the braking friction.

Such characteristics render the braking member particularly adaptable to embodiment as a brake drum lining. The preferred method of such adaptation is to expand the lining into interlocked relation with the drum by cold work of a degree less than that which may develop its maximum hardness, less than that which will unduly destroy its ductility, and to utilize the residual ductility which manifests itself as surface flow under the cold work of braking friction to progressively perfect the braking surface, and progressively build up its resistance to abrasion and resultant wear.

A third object of my invention has been to produce a brake member which is superior in its qualities of hardness, ductility and tensile strength to those of the prior art and further, to produce a braking surface which will retain these characteristics at high temperatures.

A fourth but minor object of my invention has been to produce a non-corrosive braking member and more particularly a braking member having a non-corrosive braking surface.

I have attained the objects of my invention by providing a braking element having a braking surface made of material which is austenitic at normal temperatures. In the best embodiment of my invention now known to me, I use stainless steel as a braking surface.

In the drawing,

Figures 2 and 3 represent a modified form of the same and the method of producing it, while

Figure 1:
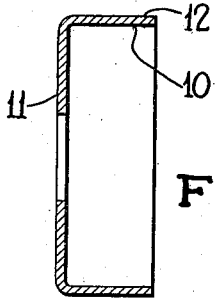
Figure 1 represents a brake drum according to my invention.

Referring to the drawing by reference characters, the numeral 10 indicates a brake drum of conventional form involving my improved invention as shown in Fig. 1. This brake drum comprises a head 11 and a braking flange 12. The entire drum I form of an austenitic metal or alloy, preferably stainless steel of a composition containing substantially 8% nickel and 18% chromium. In brake drums of the prior art the action of the friction element coacting therewith has effected a heavy wearing away of portions of the drum with which it coacts by reason of its abrasive action thereon. This abrasive action is effective to a great degree upon every successive braking operation and not only wears the brake drum out, but also in the meantime destroys the effectiveness thereof. The cold working of the material of the ordinary carbon steel drum beyond a certain point effects a deterioration thereof resulting in grabbing, and the wear steadily increases with increased mileage.

According to my improved invention I have remedied both of the above-mentioned defects by providing a braking surface of material which is austenitic and retains its superior characteristics at all normal temperatures at which the brake operates. As a consequence of this substitution I have not only effectively avoided the destructive abrasive effect of the brake shoe but have succeeded in using the effect of the brake shoe for a constructive instead of a destructive result. The effect of the application of the brake shoe on my improved braking surface is to cause a flow of the metal on the surface and progressively interiorly thereof to compact the same, and thus harden the surface and improve its braking properties and its capacity to resist abrasion upon further braking action at one and the same time.

Another defect common to brake drums of the prior art has been the very considerable loss of tensile strength at high temperatures. The hardness of these members has also been deleteriously effected by the undue heat to which they are quite frequently subjected, especially in heavy vehicles such as busses and trucks. As a consequence of these facts, brake drums have been subject to distortion and uneven wear of the surface metal thereof and these factors have frequently combined to destroy the effectiveness of a drum.

The austenitic stainless steel which I use is capable of retaining its physical properties under heat to a much greater degree than the materials heretofore used in brake drums, and entirely obviates this troublesome problem.

Repeated applications of the brake shoe produce a burnishing and toughening of the material of the drum as contrasted with the relative lack of burnishing and deterioration produced in the ordinary carbon steel drum. My improved brake drum actually "improves with use".

Figures 2, 3:
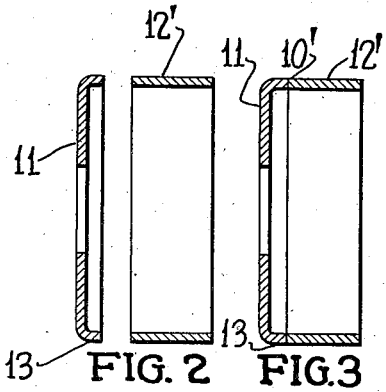

In Figure 1 I have illustrated my improved invention as applied to the entire body of a brake drum. In Figures 2 and 3, on the other hand, I have illustrated a less expensive arrangement involving a braking flange 12 of suitable austenitic material such as stainless steel, welded to a rudimentary flange 13 on the drum head 11 to produce the flange 10' of the brake drum. I thus obtain the advantage of the stainless steel braking surface without being subjected to the expense of forming the entire drum of stainless steel. Figure 2 illustrates the two parts of this brake drum as originally formed, and Figure 3 illustrates them butt welded together in their final condition.

Figure 4:
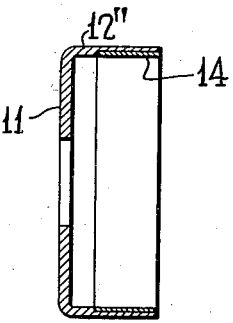
Figure 4 shows a second modification.

In both of the above-mentioned embodiments I have illustrated my entire braking flange as being formed of stainless steel. As a matter of fact, this is not entirely necessary; indeed, very important advantages flow from the use of a liner of stainless steel secured within a drum of carbon steel or other inexpensive material as illustrated in Figure 4.

In this embodiment a liner 14 of stainless steel or other suitable austenitic material is secured within a rabbetted portion of a flange 12" which is integral with a head 11. I do not wish to lay claim to the method of forming a brake drum which consists in securing a liner of material having superior characteristics for brake drum use within a drum, but I do claim that the application of the particular liner of my invention formed of suitable austenitic material such as stainless steel, constitutes an important improvement in the art.

The lining may be secured in place by any suitable method. However, a preferred method, devised by Warren H. Farr, of Detroit, Michigan, enables the full realization of the advantages peculiar to this particular type of lining. According to the Farr method, the lining is swaged into place internally to effect a molecular or other interlock between the material thereof and the material of the brake drum, the swaging-in operation effecting a beneficial cold working of the lining. This swaging-in operation, when properly performed, hardens the lining without destroying its ductility. It has been found that by the use of stainless steel in this connection the interlocking of the lining and the drum, as well as the cold working of the metal of the lining to effect a superior and more durable braking surface may be effected by a much smaller amount of swaging than in the instance of any braking surface materials proposed in the prior art. A further advantage of the use of stainless steel in this connection is that the beneficial cold working continues after the drum is placed in use upon the vehicle, the action of the friction shoe itself burnishing the lining and effecting a flow of the metal thereof to progressively harden the friction surface. A lining so swaged in will not crystallize during the life of the car and is free from the destructive action of abrasion.

Figure 5:
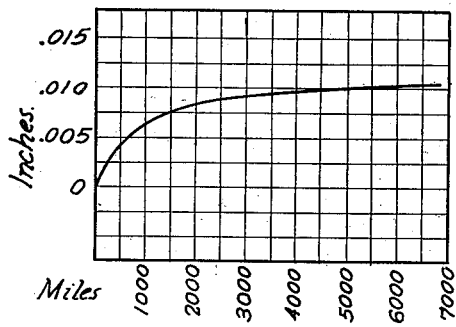
Figures 5 to 8 illustrate graphically, results of wear tests to which I have subjected braking members of the material of my invention and braking members of other materials.
Figure 6:
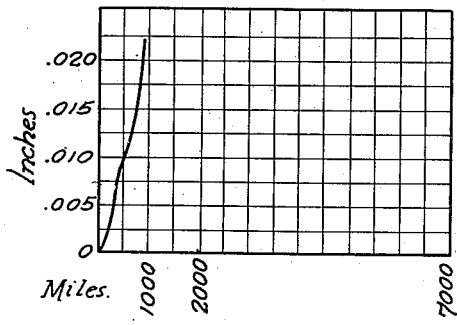
Figure 7:
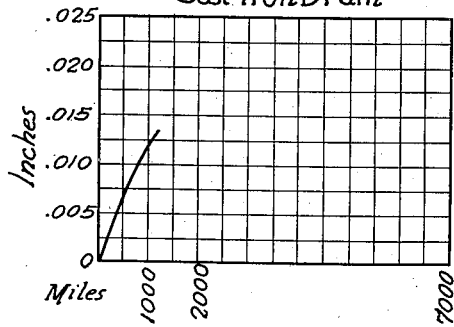
Figure 8:
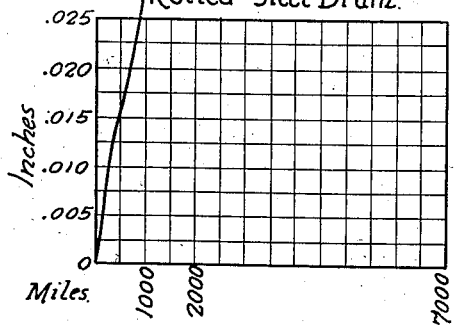

Figures 5, 6, 7 and 8 illustrate graphically the above mentioned advantages and emphasize the startling advance in the art incident to the use of my invention more adequately than general description could possibly emphasize them. In each of these figures the ordinates represent the degree of wear in thousandths of an inch and the abscissæ the amount of use in speedometer miles, the application of the brake being in all cases continuous and equal. It will be noted from Figure 5 that with a lining of stainless steel the average wear in the first thousand miles of constant application of the brakes was but .00625", whereas Figure 6 shows that with a brake drum lined with low carbon steel, there was a wear of nearly .025" before the first thousand miles were run and the brake drum had to be discarded because it was badly scored. Figure 7 illustrates the action of a cast iron drum under the same circumstances. It will be noted that the wear of this drum for the first thousand miles is almost double that of the drum lined with stainless steel and that the rate of wear of the cast iron drum is steadily increasing at the end of the first thousand miles, whereas that of the stainless steel drum has greatly decreased and is still steadily decreasing. Figure 8 illustrates the action of a rolled carbon steel brake drum of a commercial type under the same circumstances. It will be noted that at a time corrseponding to that at which the stainless steel drum has worn .00625" the rolled brake drum has worn practically .030", in other words, almost five times as much as the stainless steel drum. The test had to be discontinued at the end of the first thousand miles because the drum was so badly scored as to be of no further use.

An even more noteworthy effect than that mentioned in the first paragraph is apparent, however, upon a further study of Fig. 5 as compared with the succeeding figures, for, whereas the brake drums of Figures 6, 7 and 8 were all almost completely ruined during the first thousand miles, the rate of wear on the brake drum of Figure 5 corresponding to the applicant's invention gradually descreased during the first thousand miles and was negligible on the second thousand miles becoming thereafter even smaller until, at the end of seven thousand miles of continuous application, it apparently wears at a uniform but negligible rate. Instead of crystallizing and wearing away more and more and more rapidly with the degree of use my improved braking surface is progressively cold worked and toughened by these braking efforts, ultimately becoming so tough that further applications of the brake shoe produce an almost negligible wear. The coefficient of friction is nevertheless maintained at a highly adequate value and the brake thus outlives the automobile.

Although I have described my invention as applicable to brake drums, it will be obvious that it may be used in other connections, such, for example, as in clutches, and that it is not limited in its application even in connection with brakes to the drum member, as a brake shoe might well be made in this manner to advantage where metal to metal brakes are used.

Although I have described my invention as applicable to brake drums of austenitic stainless steel, I wish it to be understood that certain of its advantages are inherent in the use of stainless steels which do not possess austenitic characteristics to any marked degree. Such steels are highly desirable for brake drum use by reason of their retention of physical properties at high temperatures and their resistance to corrosion, and I therefore claim the use of stainless steels broadly in connection with friction surfaces. I also wish it to be understood that other austenitic materials than these stainless steels come within the scope of my invention, and cast manganese steel of austenitic characteristics or an austenitic carbon chrome steel should have the same characteristics of resistance to wear and improvement with use as a stainless steel drum. Accordingly, I claim the use of austenitic materials broadly in connection with friction surfaces and not merely the use of stainless steel.

The term "austenitic steel" as used in the appended claims comprehends a solid solution of carbon in gamma iron together with any other metals, the inclusion of which will not destroy this molecular structure. The term "stainless steel" as used in the appended claims is used to define any of the iron, nickel and chromium alloys which are highly resistant to corrosion.

The normal temperatures mentioned herein refer generally to normal atmospheric temperatures. These temperatures are believed to generally fall within a range of the order of from about 50° below zero F. to about 150° above zero F. The normal operating range of temperatures in which the austenitic stainless steel mentioned will maintain its austenitic character includes a very much greater range of operative temperatures, this range extending up to possibly about 1500° F. This range of temperatures within which the metal retains its austenitic stainless character is believed to be sufficiently comprehensive to include substantially all conditions of braking operation such as are present in the operation of well hoists, automobiles and other fields of use.

So far as I am at present advised, my invention represents such a radical departure from past practice and such a marked advance in the art as to invite modification, and I do not therefore wish to be limited except by the terms of my subjoined claims as interpreted in the light of the broad spirit of my invention and the prior art.

What I claim is:

1. A braking member of material which is austenitic at normal operating temperatures.

2. A braking member having a braking surface of material which is austenitic at normal operating temperatures.

3. An austenitic stainless steel brake drum.

4. A brake drum having a braking surface of material which is austenitic at normal operating temperatures.

5. A brake drum of material which is austenitic at normal operating temperatures.

6. A braking member having an austenitic stainless steel braking surface.

7. A braking member having a lining of austenitic stainless steel swaged therein.

8. A braking member having a lining of austenitic stainless steel.

9. A friction member having a wear surface of material which is austenitic at normal operating temperatures.

10. A friction member having a friction surface of steel containing approximately 8 per cent nickel and 18 per cent chromium.

11. A brake drum having a braking surface of steel containing approximately eight percent nickel and eighteen percent chromium.

12. A friction member having a friction surface of material which is initially austenitic and ductile in character at the normal operating temperatures of said member, and whose surface rapidly increases in resistance to abrasion during the initial period of operation thereof at normal operating temperatures, and which surface wears insubstantially during the further period of operation of said member at normal operating temperatures.

EARL J. W. RAGSDALE.